(12) United States Patent
Pertierra et al.

(10) Patent No.: US 12,523,965 B2
(45) Date of Patent: Jan. 13, 2026

(54) PROJECTION SYSTEM AND METHOD OF DRIVING A PROJECTION SYSTEM

(71) Applicants: DOLBY LABORATORIES LICENSING CORPORATION, San Francisco, CA (US); DOLBY INTERNATIONAL AB, Amsterdam (NL)

(72) Inventors: Juan Pablo Pertierra, Fishers, IN (US); Martin J. Richards, Gig Harbor, WA (US); Clement Luc Carol Le Barbenchon, Los Angeles, CA (US); Angelo Miguel Pires Arrifano, Villeneuve-Loubet (FR)

(73) Assignees: DOLBY LABORATORIES LICENSING CORPORATION, San Francisco, CA (US); Dolby International AB, Dublin (IE)

( * ) Notice: Subject to any disclaimer, the term of this patent is extended or adjusted under 35 U.S.C. 154(b) by 821 days.

(21) Appl. No.: 17/784,610

(22) PCT Filed: Dec. 11, 2020

(86) PCT No.: PCT/US2020/064663
§ 371 (c)(1),
(2) Date: Jun. 10, 2022

(87) PCT Pub. No.: WO2021/119524
PCT Pub. Date: Jun. 17, 2021

(65) Prior Publication Data
US 2023/0026771 A1    Jan. 26, 2023

Related U.S. Application Data

(60) Provisional application No. 62/946,559, filed on Dec. 11, 2019.

(30) Foreign Application Priority Data

Dec. 11, 2019 (EP) .................................... 19215112

(51) Int. Cl.
*G03H 1/22* (2006.01)
*G03H 1/32* (2006.01)
*H04N 9/31* (2006.01)

(52) U.S. Cl.
CPC ......... *G03H 1/2294* (2013.01); *H04N 9/3188* (2013.01); *G03H 1/32* (2013.01)

(58) Field of Classification Search
None
See application file for complete search history.

(56) References Cited

U.S. PATENT DOCUMENTS 8,125,713 B2   2/2012  Gluckstad
8,878,759 B2   11/2014 Crossland
(Continued)

FOREIGN PATENT DOCUMENTS

GB    2585212 B      9/2021
JP    2009524845 A   7/2009
(Continued)

OTHER PUBLICATIONS

Bartlett, T. et al "Adapting Texas Instruments DLP Technology to Demonstrate a Phase Spatial Light Modulator" SPIE Proceedings vol. 10932, published Mar. 4, 2019, 13 pages.
(Continued)

*Primary Examiner* — Jyotsna V Dabbi

(57) ABSTRACT

A projection system and method includes a light source configured to emit a light in response to an image data; a phase light modulator configured to receive the light from the light source and to apply a spatially-varying phase modulation on the light; and a controller configured to determine, for a frame of the image data, a plurality of phase
(Continued)

configurations, respective ones of the plurality of phase configurations corresponding to solutions of a phase algorithm and representing the same image with a different modulation pattern, and provide a phase control signal to the phase light modulator, the phase control signal configured to cause the phase light modulator to modulate the plurality of phase configurations in a time-divisional manner within a time period of the frame, thereby to project a series of subframes within the time period.

19 Claims, 11 Drawing Sheets

(56) References Cited

U.S. PATENT DOCUMENTS

| | | | |
|---|---|---|---|
| 2009/0002787 A1 | 1/2009 | Cable | |
| 2010/0253762 A1* | 10/2010 | Cheong | G03H 1/0866 348/E13.001 |
| 2011/0109948 A1* | 5/2011 | Cable | G03H 1/2294 359/9 |
| 2012/0008181 A1 | 1/2012 | Cable | |
| 2014/0118806 A1 | 5/2014 | Crossland | |
| 2017/0269214 A1 | 9/2017 | Marron | |
| 2018/0270457 A1 | 9/2018 | Damberg | |
| 2018/0373129 A1 | 12/2018 | Pertierra | |
| 2020/0288093 A1 | 9/2020 | Pertierra | |
| 2022/0038667 A1 | 2/2022 | Richards | |

FOREIGN PATENT DOCUMENTS

| | | | |
|---|---|---|---|
| JP | 2011528132 A | 11/2011 | |
| JP | 2015509208 A | 3/2015 | |
| JP | 2017532583 A | 11/2017 | |
| WO | 2013094011 A1 | 6/2013 | |
| WO | 2019031230 A1 | 2/2019 | |
| WO | 2019060802 A1 | 3/2019 | |
| WO | WO-2019119458 A1 * | 6/2019 | G01N 21/64 |

OTHER PUBLICATIONS

Chellappan, Kishore V. et al "Laser-Based Displays: a Review" Applied Optics 49.25, 2010, F79-F98.

Damberg, Gerwin "Computational projection display: towards efficient high brightness projection in cinema" Diss. University of British Columbia, Jul. 2017.

* cited by examiner

PROJECTION SYSTEM AND METHOD OF DRIVING A PROJECTION SYSTEM

CROSS-REFERENCE TO RELATED APPLICATIONS

This application claims priority of U.S. Provisional Patent Application No. 62/946,559, filed Dec. 11, 2019, and European Patent Application No. 19215112.4, filed Dec. 11, 2019, both of which are hereby incorporated by reference in their entireties.

BACKGROUND

1. Field of the Disclosure

This application relates generally to projection systems and methods of driving a projection system.

2. Description of Related Art

Digital projection systems typically utilize a light source and an optical system to project an image onto a surface or screen. The optical system includes components such as mirrors, lenses, waveguides, optical fibers, beam splitters, diffusers, spatial light modulators (SLMs), and the like.

Some projections systems are based on SLMs that implement spatial amplitude modulation. In such a system, the light source provides a light field that embodies the brightest level that can be reproduced on the image, and light is attenuated (e.g., discarded) in order to create the desired scene levels. In such a configuration, light that is not projected to form any part of the image is attenuated or discarded. Alternatively, a projection system may be configured such that light is steered instead of attenuated. However, projection systems which steer light rather than discard or attenuate light may implement one or more secondary modulators in order to achieve acceptable image quality. The above may especially be true in cases where high dynamic range (HDR) images are projected. In such cases, the contrast ratio of the projection system may be affected by the attenuation of light or the secondary modulators. In this manner, projection systems as described above typically rely on various components that may negatively impact the optical and/or power efficiency of the projection system, and may add to the projection system's complexity and cost.

BRIEF SUMMARY OF THE DISCLOSURE

Various aspects of the present disclosure relate to circuits, systems, and methods for projection display using phase-only light modulation.

In one exemplary aspect of the present disclosure, there is provided a projection system comprising a light source configured to emit a light in response to an image data; a phase light modulator configured to receive the light from the light source and to apply a spatially-varying phase modulation on the light; and a controller configured to determine, for a frame of the image data, a plurality of phase configurations, respective ones of the plurality of phase configurations corresponding to solutions of a phase algorithm and representing the same image with a different modulation pattern, and provide a phase control signal to the phase light modulator, the control signal configured to cause the phase light modulator to modulate light in accordance with the plurality of phase configurations in a time-divisional manner within a time period of the frame, thereby causing the projection system to project a series of subframes within the time period.

In another exemplary aspect of the present disclosure, there is provided a method of driving a projection system comprising emitting a light by a light source, in response to an image data; receiving the light by a phase light modulator; applying a spatially-varying phase modulation on the light by the phase light modulator; for a frame of the image data, determining a plurality of phase configurations, respective ones of the plurality of phase configurations corresponding to solutions of a phase algorithm and representing the same image with a different modulation pattern; and providing a phase control signal to the phase light modulator, and thereby causing the phase light modulator to modulate light in accordance with the plurality of phase configurations in a time-divisional manner within a time period of the frame, and thereby projecting a series of subframes within the time period.

In another exemplary aspect of the present disclosure, there is provided a non-transitory computer-readable medium storing instructions that, when executed by a processor of a projection device, cause the projection device to perform operations comprising emitting a light by a light source, in response to an image data; receiving the light by a phase light modulator; applying a spatially-varying phase modulation on the light by the phase light modulator; for a frame of the image data, determining a plurality of phase configurations, respective ones of the plurality of phase configurations corresponding to solutions of a phase algorithm and representing the same image with a different modulation pattern; and providing a phase control signal to the phase light modulator, and thereby causing the phase light modulator to modulate light in accordance with the plurality of phase configurations in a time-divisional manner within a time period of the frame, and thereby projecting a series of subframes within the time period.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In the following description, numerous details are set forth, such as circuit configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to project light; for example, cinema, consumer and other commercial projection systems, heads-up displays, virtual reality displays, and the like.

Projector Systems

In a projector system, various internal components, such as components of the optical system, may introduce inefficiencies. For example, where an image is formed by attenuating or discarding light, the discarded or attenuated light is no longer available to achieve brighter detail in other parts of the image. If the image is formed by steering light, the additional modulators which may be used could result in increased power consumption, increased design complexity, increased manufacturing costs, and the like.

Figure 1:
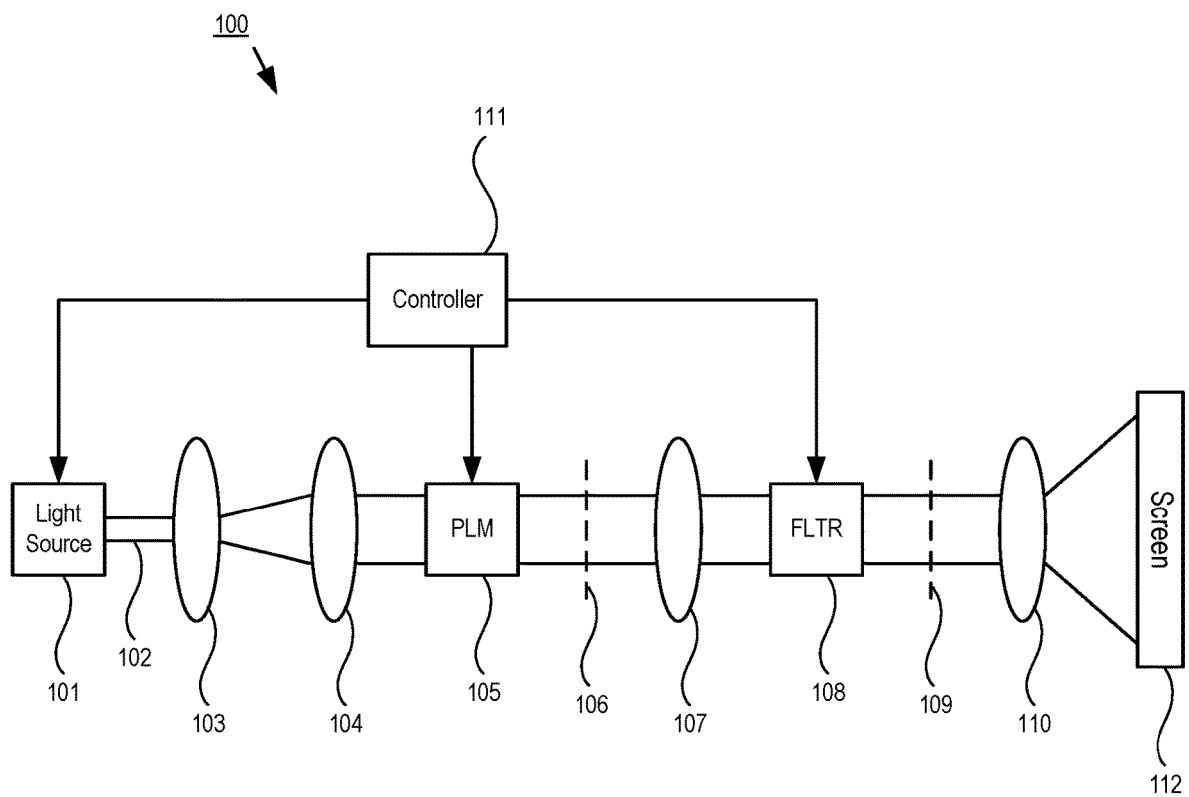
FIG. 1 illustrates a block diagram of an exemplary projection system according to various aspects of the present disclosure.

FIG. 1 illustrates a block diagram of an exemplary phase-only projection system 100 according to various aspects of the present disclosure. Specifically, FIG. 1 illustrates a projection system 100 which includes a light source 101 configured to emit a beam 102 of light, a first lens 103 configured to expand the light, a second lens 104 configured to collimate the expanded light, a phase light modulator (PLM) 105 configured to apply a spatially-varying phase modulation thereby to steer the collimated light, a third lens 107, a filter 108, a fourth lens 110 configured to form an image on a screen 112, and a controller 111 configured to control various components of the projection system 100. Also illustrated are a reconstruction plane 106 of the PLM 105, and a reconstruction image plane 109. While the reconstruction plane 106 is illustrated as being located optically downstream from the PLM 105, the reconstruction plane 106 may be a virtual reconstruction plane and thus located optically upstream from the PLM 105.

The optics illustrated in FIG. 1, such as the various lenses, are exemplary and not limiting. In practical implementations, the projection system 100 may include fewer optical components or may include additional optical components such as mirrors, lenses, waveguides, optical fibers, beam splitters, diffusers, and the like. With the exception of the screen 112, the components illustrated in FIG. 1 may be integrated into a housing to provide a projection device. Such a projection device may include additional components such as a memory, input/output ports, communication circuitry, a power supply, and the like.

The light source 101 may be, for example, a laser light source, an LED, and the like. Generally, the light source 101 is any light emitter which emits coherent light. In some aspects of the present disclosure, the light source 101 may comprise multiple individual light emitters, each corresponding to a different wavelength or wavelength band. The light source 101 emits light in response to an image signal provided by the controller 111. The image signal includes image data corresponding to a plurality of frames to be successively displayed. The controller 111 may be, for example, one or more processors such as a central processing unit (CPU) of the projection system 100. The image signal may originate from an external source in a streaming or cloud-based manner, may originate from an internal memory of the projection system 100 such as a hard disk, may originate from a removable medium that is operatively connected to the projection system 100, or combinations thereof.

The filter 108 may be provided to mitigate effects caused by internal components of the projection system 100. In some systems, the PLM 105 (which will be described in more detail below) may include a cover glass and cause reflections, device switching may temporarily cause unwanted steering angles, and various components may cause scattering. To counteract this and decrease the floor level of the projection system 100, the filter 108 may be a Fourier ("DC") filter component. Thus, the filter 108 may increase contrast by reducing the floor level from light near zero angle, which will correspond to such elements as cover-glass reflections, stroke transitions states, and the like. This DC block region may be actively used by the algorithm to prevent certain light from reaching the screen. In some aspects of the present disclosure, the filter 108 prevents the undesired light from reaching the screen by steering said light to a light dump located outside the active image area, in response to control from the controller 111.

Phase Light Modulator

As illustrated in FIG. 1, the controller 111 also controls the PLM 105, which receives light from the light source 101. The PLM 105 imparts a spatially-varying phase modulation to the light, and redirects the modulated light toward the third lens 107. The PLM 105 may be a reflective type, in which the PLM 105 reflects incident light with a spatially-varying phase; alternatively, the PLM 105 may be of a transmissive type, in which the PLM 105 imparts a spatially-varying phase to light as it passes through the PLM 105. In some aspects of the present disclosure, the PLM 105 has a liquid-crystal-on-silicon (LCOS) architecture or may be a micro-electromechanical system (MEMS) such as a digital micromirror device (DMD).

Figure 2:
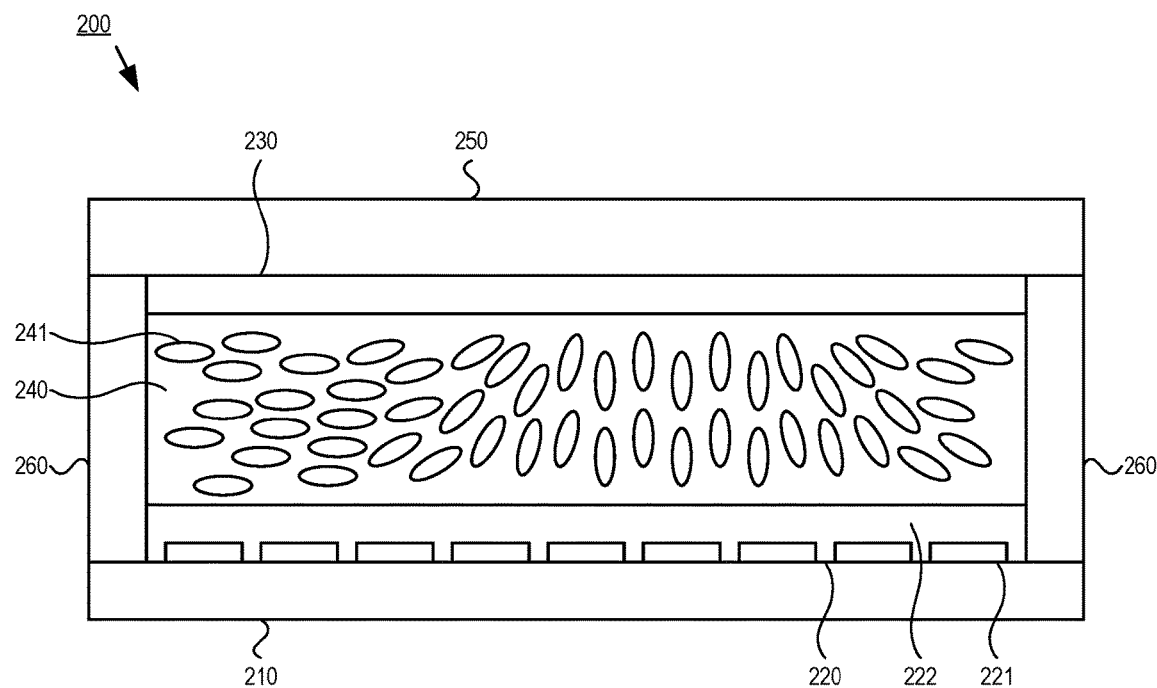
FIG. 2 illustrates an exemplary phase modulator for use with various aspects of the present disclosure.

FIG. 2 illustrates one example of the PLM 105, implemented as a reflective LCOS PLM 200 and shown in a partial cross-sectional view. As illustrated in FIG. 2, the PLM 200 includes a silicon backplane 210, a first electrode layer 220, a second electrode layer 230, a liquid crystal layer 240, a cover glass 250, and spacers 260. The silicon backplane 210 includes electronic circuitry associated with the PLM 200, such as complementary metal-oxide semiconductor (CMOS) transistors and the like. The first electrode layer 220 includes an array of reflective elements 221 disposed in a transparent matrix 222. The reflective elements 221 may be formed of any highly optically reflective material, such as aluminum or silver. The transparent matrix 222 may be formed of any highly optically transmissive material, such as a transparent oxide. The second electrode layer 230 may be formed of any optically transparent electrically conductive material, such as a thin film of indium tin oxide (ITO). The second electrode layer 230 may be provided as a common electrode corresponding to a plurality of the reflective elements 221 of the first electrode layer 220. In such a configuration, each of the plurality of the reflective elements 221 will couple to the second electrode layer 230 via a respective electric field, thus dividing the PLM 200 into an array of pixel elements. Thus, individual ones (or subsets) of the plurality of the reflective elements 221 may be addressed via the electronic circuitry disposed in the silicon backplane 210, thereby to modify the state of the corresponding reflective element 221.

The liquid crystal layer 240 is disposed between the first electrode layer 220 and the second electrode layer 230, and includes a plurality of liquid crystals 241. The liquid crystals 241 are particles which exist in a phase intermediate between a solid and a liquid; in other words, the liquid crystals 241 exhibit a degree of directional order, but not positional order. The direction in which the liquid crystals 241 tend to point is referred to as the "director." The liquid crystal layer 240 modifies incident light entering from the cover glass 250 based on the birefringence Δn of the liquid crystals 241, which may be expressed as the difference between the refractive index in a direction parallel to the director and the refractive index in a direction perpendicular to the director. From this, the maximum optical path difference may be expressed as the birefringence multiplied by the thickness of the liquid crystal layer 240. This thickness is set by the spacer 260, which seals the PLM 200 and ensures a set distance between the cover glass 250 and the silicon backplane 210. The liquid crystals 241 generally orient themselves along electric field lines between the first electrode layer 220 and the second electrode layer 230. As illustrated in FIG. 2, the liquid crystals 241 near the center of the PLM 200 are oriented in this manner, whereas the liquid crystals 241 near the periphery of the PLM 200 are substantially non-oriented in the absence of electric field lines. By addressing individual ones of the plurality of reflective elements 221 via a phase-drive signal, the orientation of the liquid crystals 241 may be determined on a pixel-by-pixel basis.

Figure 3:
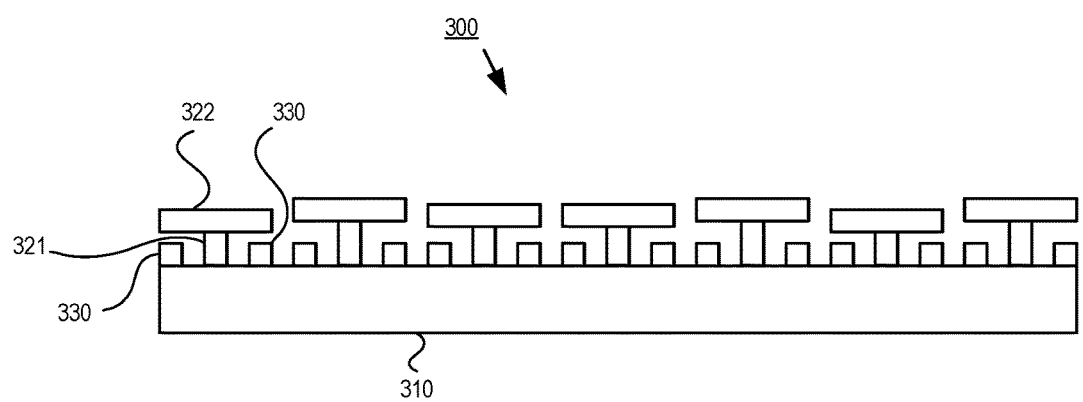
FIG. 3 illustrates another exemplary phase modulator for use with various aspects of the present disclosure.

FIG. 3 illustrates another example of the PLM 105, implemented as a DMD PLM 300 and shown in a partial cross-sectional view. As illustrated in FIG. 3, the PLM 300 includes a backplane 310 and a plurality of controllable reflective elements as pixel elements, each of which includes a yoke 321, a mirror plate 322, and a pair of electrodes 330. While only two electrodes 330 are visible in the cross-sectional view of FIG. 3, each reflective element may in practice include additional electrodes. While not particularly illustrated in FIG. 3, the PLM 300 may further include spacer layers, support layers, hinge components to control the height or orientation of the mirror plate 322, and the like. The backplane 310 includes electronic circuitry associated with the PLM 300, such as CMOS transistors, a memory array, and the like.

Figure 4:
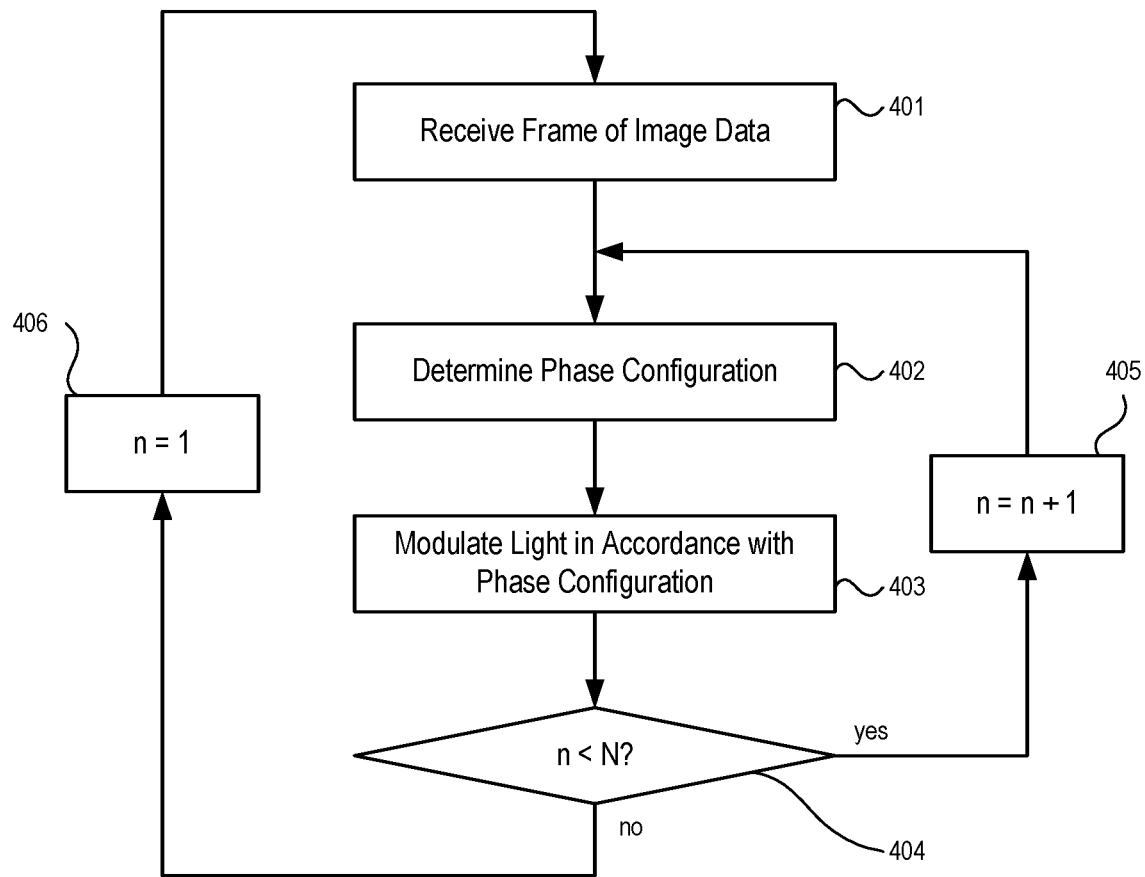
FIG. 4 illustrates an exemplary process flow according to various aspects of the present disclosure.

The yoke 321 may be formed of or include an electrically conductive material so as to permit a biasing voltage to be applied to the mirror plate 322. The mirror plate 322 may be formed of any highly reflective material, such as aluminum or silver. The electrodes 330 are configured to receive a first voltage and a second voltage, respectively, and may be individually addressable. Depending on the values of a voltage on the electrodes 330 and a voltage (for example, the biasing voltage) on the mirror plate 322, a potential difference exists between the mirror plate 322 and the electrodes 330, which creates an electrostatic force that operates on the mirror plate 322. The yoke 321 is configured to allow vertical movement of the mirror plate 322 in response to the electrostatic force. The equilibrium position of the mirror plate 322, which occurs when the electrostatic force and a spring-like force of the yoke 322 are equal, determines the optical path length of light reflected from the upper surface of the mirror plate 322. Thus, as illustrated in FIG. 4, individual ones of the plurality of controllable reflective elements are controlled to provide a number (as illustrated, three) of discrete heights and thus a number of discrete phase configurations or phase states. As illustrated, each of the phase states has a flat profile. In some aspects of the present disclosure, the electrodes 330 may be provided with different voltages from one another so as to impart a tilt to the mirror plate 322. Such tilt may be utilized with a light dump of the type described above.

The PLM 300 may be capable of high switching speeds, such that the PLM 300 switches from one phase state on the order of tens of μs, for example. In order to provide for a full cycle of phase control, the total optical path difference between a state where the mirror plate 322 is at its highest point and a state where the mirror plate 322 is at its lowest point should be approximately equal to the wavelength of incident light. Thus, the height range between the highest point and the lowest point should be approximately equal to $\lambda/2$.

Regardless of which particular architecture is used for the PLM 105, it is controlled by the controller 111 to take particular phase configurations on a pixel-by-pixel basis. Thus, the PLM 105 utilizes an array of the respective pixel elements, such as a 960×540 array. The number of pixel elements in the array may correspond to the resolution of the PLM 105. Due to the nature of steering that can be implemented, light may be steered to any location on the reconstruction image plane and is not tied to the same pixel grid as the PLM 105. As the PLM 105 is capable of a fast response time, high-resolution moving images may be generated on the reconstruction image plane. The operation of the PLM 105 may be affected by the data bandwidth of the projection system 100, stroke quantization of the PLM 105, and/or response time of the PLM 105. The maximum resolution may be determined by the point-spread function (PSF) of the light source 101 and on parameters of various optical components in the projection system 100.

While it can be difficult to create a very high-quality image with a single phase configuration per image frame, the PLM 105 in accordance with the present disclosure is capable of a fast response time; thus, multiple phase configurations can be presented in succession for a single frame, which are then integrated by the human eye into a high-quality image.

Phase Configurations

FIG. 4 illustrates an exemplary process flow for a phase-only projection method according to various aspects of the present disclosure. The process flow may be executed in a controller of a phase-only projection system, such as in the controller 111 of the projection system 100 illustrated in FIG. 1.

At 401, the controller receives a frame of image data. The frame may be in the form of an image signal that is provided from an external, internal, or removable source. The image signal includes a series of frames at a rate dependent on the framerate of the particular application. Each frame includes image data for producing an image on a screen at a particular resolution. The present disclosure is not particularly limited in the framerates and/or resolutions which may be implemented. For example, the framerate may be 24 Hz or 48 Hz for cinema applications; 30 Hz, 60 Hz, or 120 Hz for home applications, and the like. Furthermore, the resolution may be 2K (2048×1080), 4K (4096×2160), 1080p (1920×1080), consumer 4K (3840×2160) and the like.

At 402, the controller calculates a solution of a phase algorithm to thereby determine or generate a phase configuration. The phase configurations may be generated using a diffraction-aware phase algorithm that approximates the image levels with a varying noise profile. Each solution of the phase algorithm describes a representation of the same image with a different steering or modulation pattern. When many solutions are integrated over time, this reduces the visibility of any artifacts that might be exposed in any one steering configuration. The variability may be introduced in the form of a random or pseudorandom seed, by variation of computational parameters such as wavelength, or the like.

The phase algorithm may operate by establishing a bidirectional mapping between the complex-amplitude (phasor) field at the modulation plane (the "modulation field") and the complex-amplitude field at the reconstruction plane (the "reconstruction field"). The modulation plane refers to a plane where the modulator, such as the PLM 105, is located. The reconstruction plane refers to an image-forming plane of the modulator, and may be the same as the reconstruction image plane 109. The modulation field $M(x,y)$ and the reconstruction field $R(x',y')$ may be represented by the following expressions (1) and (2):

$$M(x,y)=A_M \angle \phi_M \quad (1)$$

$$R(x',y')=A_R \angle \phi_R \quad (2)$$

In expressions (1) and (2), A and $\phi$ refer to the amplitude and phase, respectively. The bidirectional mapping may be any numerical wave propagation such as Fresnel or Rayleigh-Sommerfeld propagation. This mapping may be represented by the following expression (3s) and its converse (3b):

$$P(M(x,y)) \rightarrow R(x',y') \quad (3a)$$

$$P^{-1}(R(x',y')) \rightarrow M(x,y) \quad (3b)$$

In expressions (3a) and (3b), P is the wave propagation function. Calculating the solution of the phase algorithm may then be equivalent to finding a phase-component of the modulation field $\phi_M$ (e.g., at a plane of the PLM 105 illustrated in FIG. 1) such that the corresponding intensity-component of the reconstruction field $\tilde{I}$ best reproduces a target image at the reconstruction image plane (e.g., the reconstruction image plane 109 illustrated in FIG. 1). The intensity-component of the reconstruction field is given by the following expression (4):

$$\tilde{I}=(P(A_M \angle \phi_M))^2 \quad (4)$$

In practice, the algorithm implementation takes a target reconstruction field as an input and iteratively solves for a bidirectional mapping constrained to result in a modulation field solution that is free from amplitude information. In other words, the algorithm determines a value of $\phi_M$ from the following expression (5):

$$A_M \angle \phi_M = P^{-1}(\sqrt{I} \angle \phi_R) \quad (5)$$

Expression (5) is evaluated under constraints represented by the following expression (6):

$$|P(A_M \angle \phi_M)|^2 \approx I, \text{with } A_M \approx 1 \quad (6)$$

The phase-component of the reconstruction field is not known apriori, and thus may be utilized as a seed to produce different phase configurations (modulation phase-components $\phi_M$) that, when reconstructed, convey representations of the same image. Controller 111 of FIG. 1 may be configured to initialize the phase algorithm with a seed distribution.

At 403, the phase configuration calculated at 402 is displayed. That is, a PLM (for example, the PLM 105 illustrated in FIG. 1) is controlled such that PLM 105 modulates light in accordance with the phase configuration calculated at 402, thereby causing the projection system to project an image corresponding to the image data and the phase configuration on a screen (for example, the screen 112).

At 404, an index variable n is compared to a maximum value N. The maximum value N corresponds to the number of phase configurations that are to be displayed within a single frame period. If n<N, then n is incremented at 405 and the process returns to 402 where a new phase algorithm solution is calculated. FIG. 4 thus illustrates a method in which the phase algorithm solution is calculated for each subframe at the beginning of the subframe. In some aspects of the present disclosure, however, the phase configuration may be calculated for all subframes within a given frame at once; in such a method, the process may instead return to 403 if n<N. In either case, if n=N at 404, then n is reinitialized to 1 at 406 and the process returns to 401 and repeats for the next frame in the image signal.

Figure 5A:
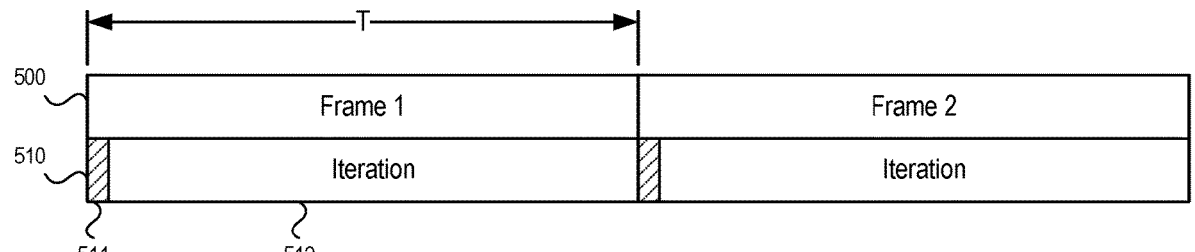
FIGS. 5A-5C respectively illustrate image frames and configurations in accordance with various aspects of the present disclosure.
Figure 5B:
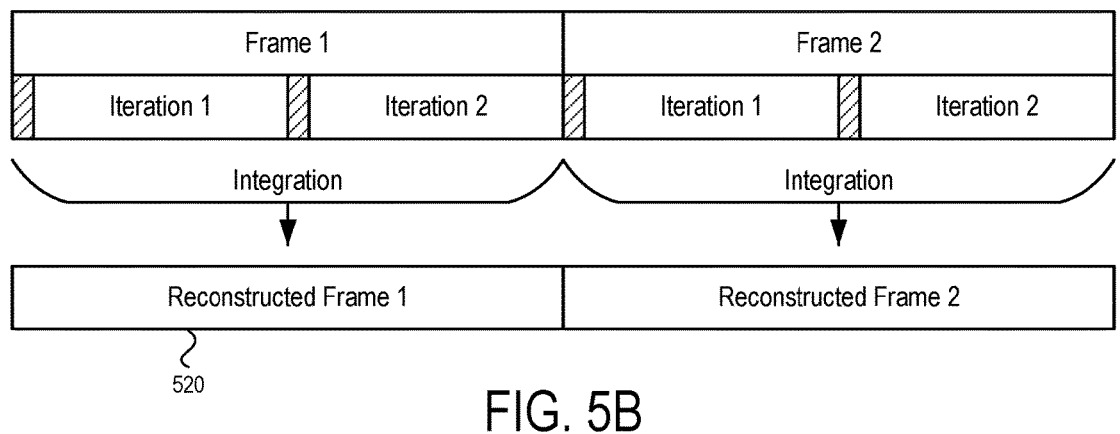
Figure 5C:
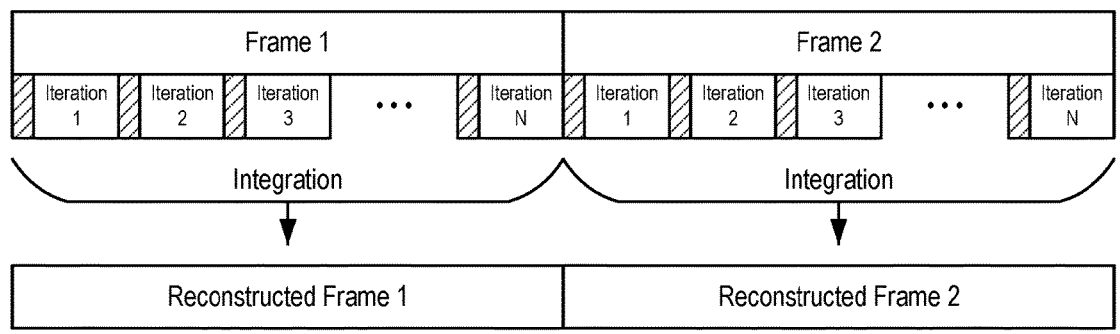

FIGS. 5A-5C respectively illustrate how the above process may be implemented with multiple successive image frames. FIG. 5A illustrates the above process with a single iteration (N=1), FIG. 5B illustrates the above process with two iterations (N=2), and FIG. 5C illustrates the above process with N iterations.

In FIGS. 5A-5C, two frames 500 of image data are illustrated. Each frame has a frame period of T. The frame period is simply the reciprocal of the framerate. For example, for a framerate of 24 Hz the frame period is approximately 42 ms. Each frame 500 is divided into N phase configurations 510, each of which includes a switching period 511 and an iteration period 512. The switching period 511 corresponds to the amount of time that the PLM takes to switch to a new phase state, and is thus independent of N. The sum of the iteration periods 512 for the frame 500 is the total amount of time for which the PLM (and thus the phase of the resultant image) is static.

Where multiple phase configurations 510 are utilized for a single frame 500 (as in FIGS. 5B-5C), the phase configurations 510 are integrated by the human eye to produce a reconstructed frame 520 having a duration equal to the frame period T. The integration operation effectively provides a temporal smoothing of noise across the phase configurations 510; thus, the viewer perceives high quality in the reconstructed frame 520.

In FIG. 5A, only a single phase configuration 510 is utilized and thus only a single switching period 511 occurs. Thus, the overall iteration time for each frame 500 is equal to the frame period minus the duration of the switching period 511. In FIG. 5B, two phase configurations 510 are utilized and thus two switching periods 511 occur. Thus, the overall iteration time for each frame 500 is equal to the frame period minus double the duration of the switching period 511. Similarly, in the general case illustrated in FIG. 5C N switching periods 511 occur and the overall iteration time for each frame 500 is equal to the frame period minus N times the duration of the switching period 511. As the number N increases and thus more phase configurations 510 are integrated into a single reconstructed frame 520, the perceived image quality increases. This is illustrated in FIGS. 6A-6D.

Figure 6A:
FIGS. 6A-6D respectively illustrate display images in accordance with various aspects of the present disclosure.
Figure 6B:
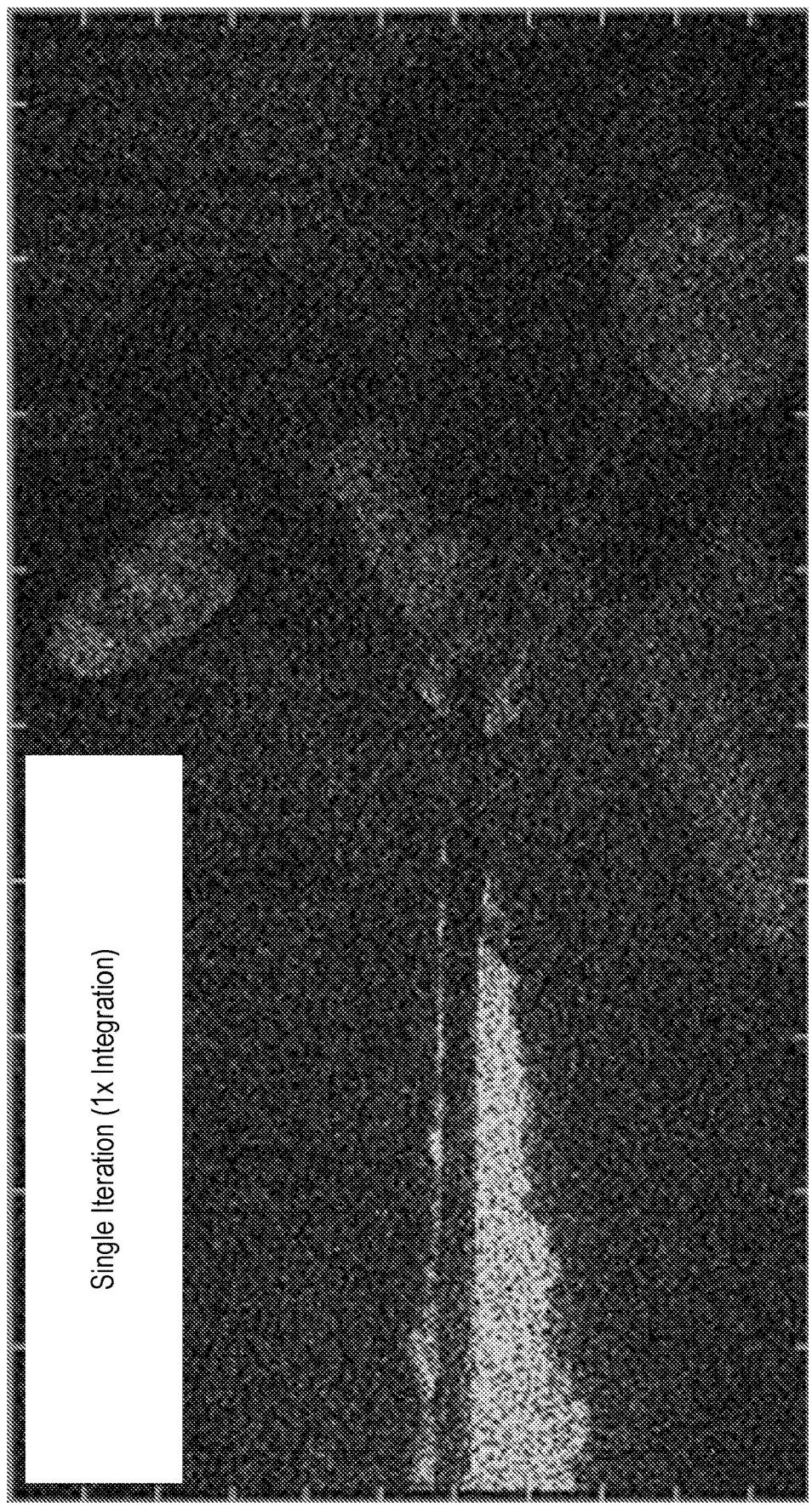
Figure 6C:
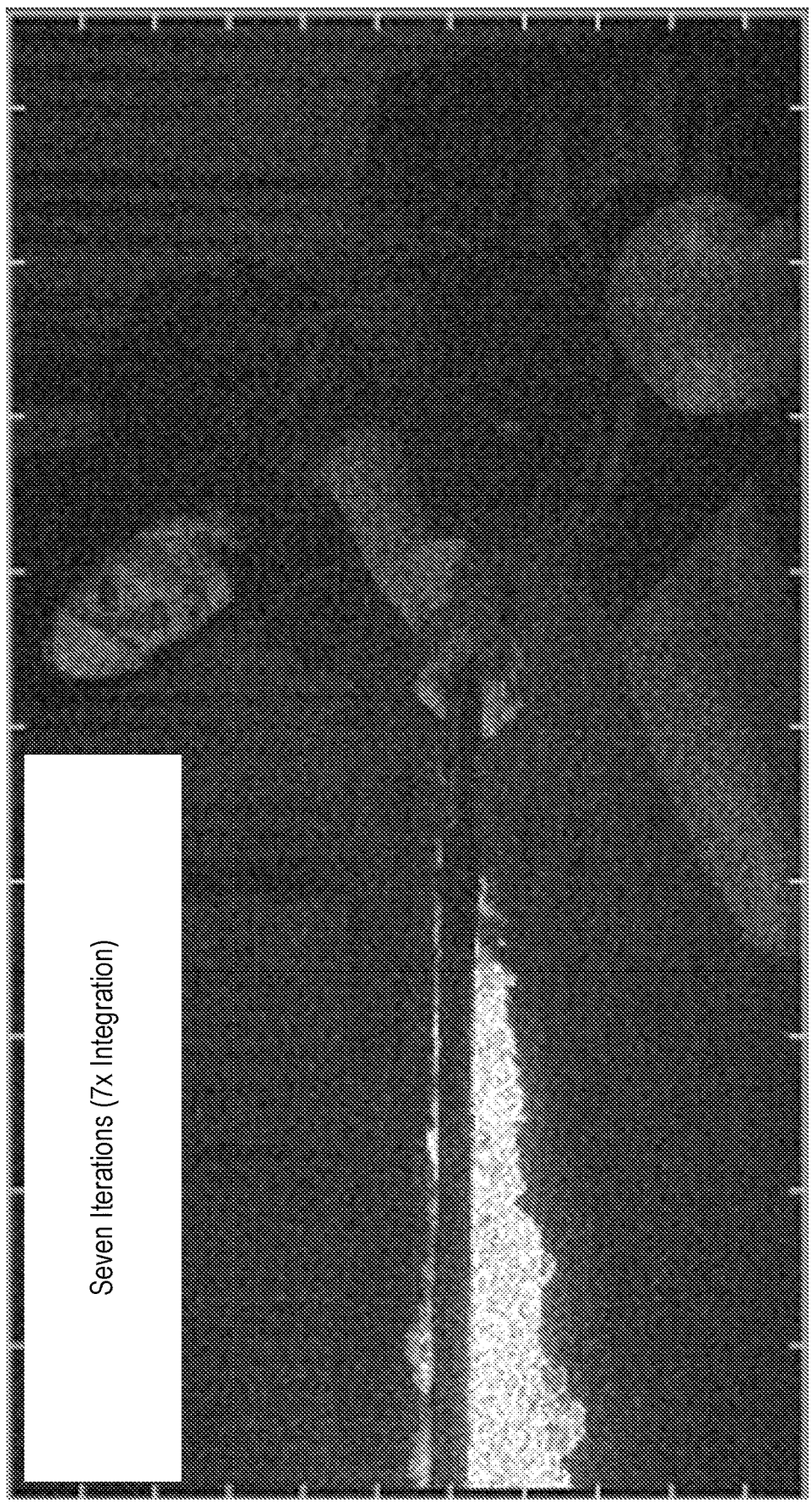
Figure 6D:

FIG. 6A illustrates a target image which includes comparatively bright portions and comparatively dark portions. FIG. 6B illustrates the result of the case where N=1 (e.g., FIG. 5A) and only a single phase configuration exists. Because the algorithm above applies phase noise to the PLM, the resulting image appears to have a speckled or staticky nature. FIG. 6C illustrates the result of the case where N=7, and thus seven phase configurations are integrated into a single reconstructed frame. While some speckle or static is still apparent as compared to the target image of FIG. 6A, the resultant image quality is greatly improved as compared to the single-configuration image of FIG. 6B. FIG. 6D illustrates the result of the case where N=60, and thus sixty phase configurations are integrated into a single reconstructed frame.

In addition to the perceived image quality illustrated in FIGS. 6A-6D, the use of multiple successive phase configurations may also provide resilience to dust effects within the projection system. That is, coherent light sources produce highly organized (and often collimated) light, causing dust and resulting diffraction effects almost anywhere in the optical path to become visible in the final image. The use of sequential phase modulation solutions results in highly diverse, dynamic light fields optically downstream from the modulator, causing angular diversity to be introduced in reproducing the image. Because each phase subframe has a different solution from the previous subframe, the visibility of physical particles in the system other than particles at the imaging plane may be reduced.

While the perceived image quality increases with the increase in N, the contrast of the resultant image may decrease as a result of the switching periods. In other words, as more phase configurations are implemented the phase of the PLM is static for a decreasing proportion of the frame period. Thus, in setting the value of N, the image quality is balanced against the image contrast. Depending on the particular parameters of the PLM such as the switching speed, the phase may be static for ~97% of the frame period with the sixty-phase integration of FIG. 6D. As such, in various aspects of the present disclosure N is preferably set to 60.

Figure 7A:
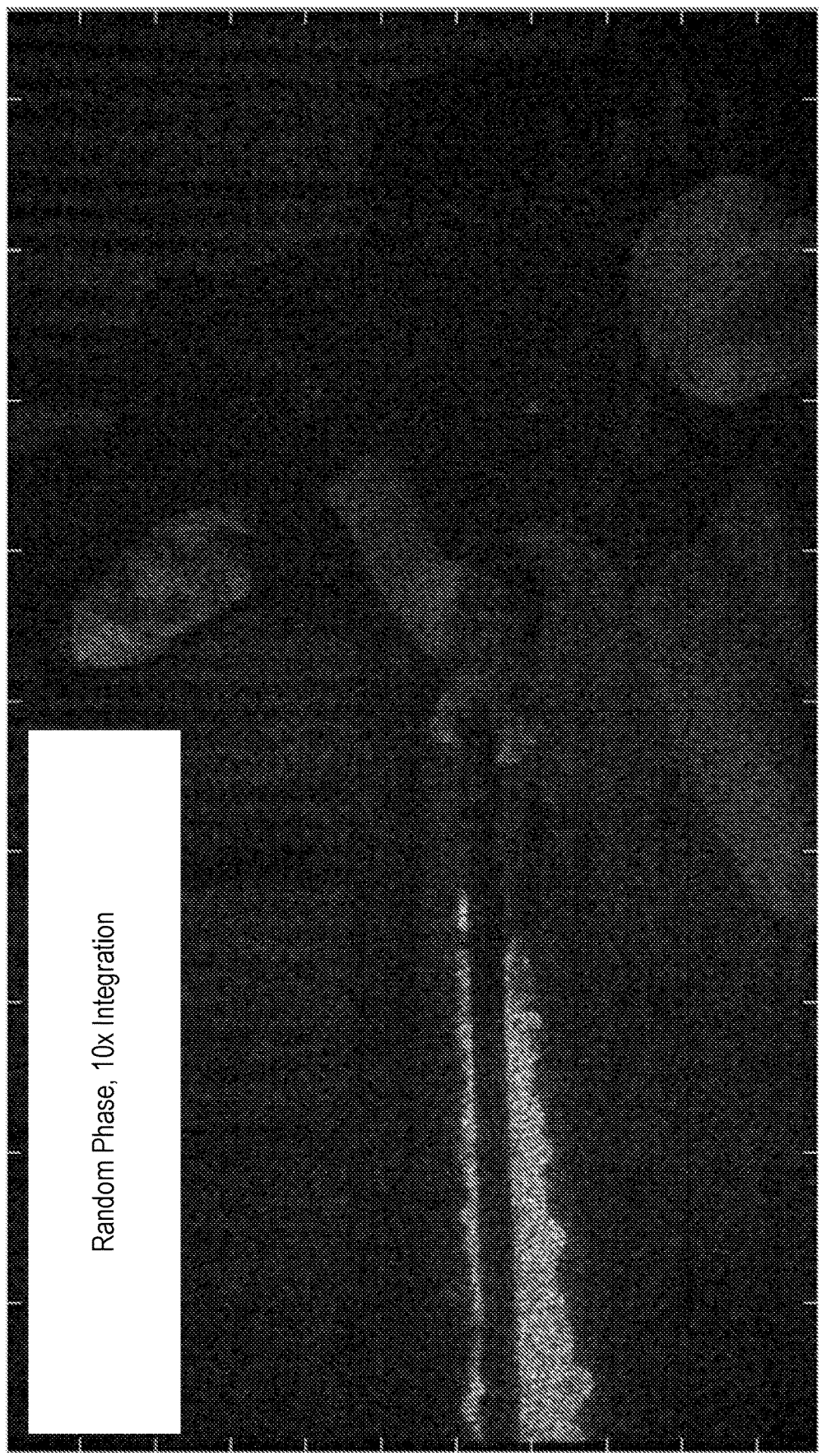
FIGS. 7A-7B respectively illustrate display images in accordance with various aspects of the present disclosure.
Figure 7B:
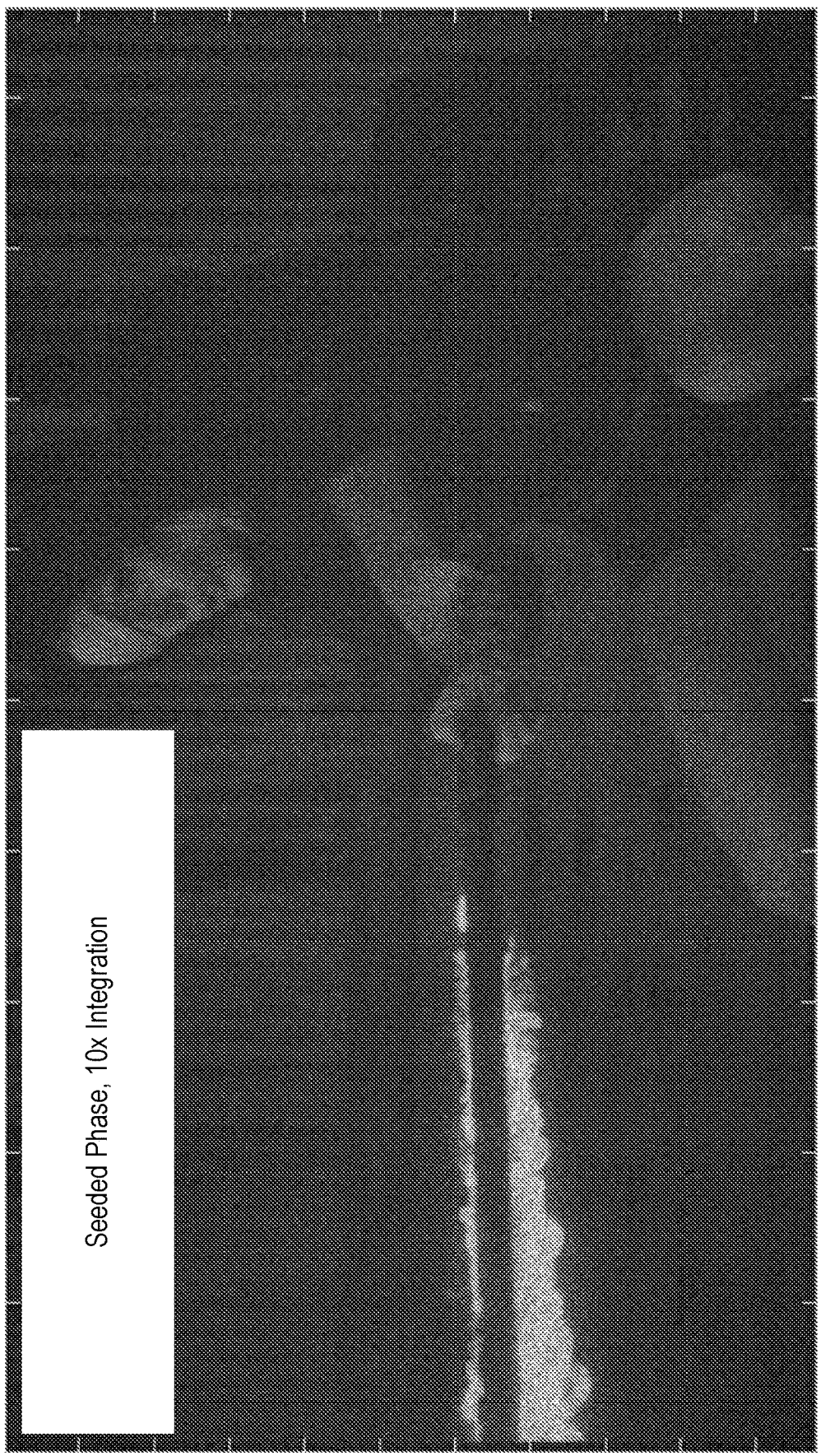

The perceived image quality may also depend on the constraints imposed on the initialization phase, as illustrated in FIGS. 7A-7B. That is, the algorithm itself does not impose many constraints on the initialization phase; however, some constraints may improve the perceived image quality of the reconstructed frames. In both FIGS. 7A-7B, N=10. However, in FIG. 7A, the initialization phase was generated by randomly sampling a uniform distribution. In FIG. 7B, the initialization phase was generated by an optimized distribution. The particular distribution used for FIG. 7B was generated by applying a Gerchberg-Saxton algorithm (which is an iterative algorithm) to a random phase pattern, and using the resulting optimized random phase as the initialization phase. In practice, the initialization phase is not constrained to these two options. For example, the initialization phase may be generated using a flat field, or by randomly sampling a distribution such as a Gaussian distribution or a white-noise distribution.

In some applications where frames are processed sequentially, the reconstruction field $\phi_R$ from one frame may be used to initialize a subsequent frame. For example, where N configurations are calculated per frame, a given frame may be initialized using some or all of the components of the reconstruction field $\phi_R$ from the previous frame. In such an example, in a first frame $F_1$ the algorithm may compute N subframe modulation field configurations $\phi_M$, each initialized with a different random phase seed; in the next frame $F_2$ the algorithm may compute N subframe modulation field configurations #m, each initialized using the subframe reconstruction field $\phi_R$ from frame $F_1$ (or a variation of the subframe reconstruction field $\phi_R$); then in frame $F_3$ the algorithm may compute N subframe modulation field configurations $\phi_M$, each initialized using the subframe reconstruction field $\phi_R$ from frame $F_2$ (or a variation of the subframe reconstruction field $\phi_R$); and so on.

In some examples, the algorithm may dynamically decide (e.g. controller 111 of FIG. 1 may dynamically determine based on the phase algorithm) whether to generate a new phase seed or to use the reconstruction field $\phi_R$ from the previous frame (e.g. to base the seed distribution on the previous frame). This decision may be based on one or more factors, including but not limited to differences between the current frame and the previous frame, motion detection, and the like. Dynamically determining whether to generate a new phase seed or to base the seed distribution on the previous frame enables the algorithm to decide dynamically, for each frame, whether to use a new seed or to re-use the seed from the previous frame. By being able to re-use the seed distribution for some frames, the algorithm is more efficient because it does not need to generate a new seed distribution for all frames.

Artifact Compensation

If the number of phase configurations used is relatively large (e.g., N≈100), artifacts (referred to herein as "intensity roll-off" artifacts) may emerge in some of the reconstruction images. Intensity roll-off artifacts may be more visible for some methods of generating the initialization phase than for others. For example, an initialization phase generated by sampling a uniform distribution may show a greater degree of intensity roll-off than an initialization phase generated by an optimized distribution. To address the possibility or occurrence of intensity roll-off artifacts, the algorithm may be modified to accept a roll-off compensation map C as an input. In view of expression (5) above, the modified algorithm may be represented according to the following expression (7):

$$A_M \angle \phi_M = P^{-1}(\sqrt{IC} \angle \phi_R) \tag{7}$$

In other words, the target image to be achieved by the algorithm is I compensated by a multiplicative map C to account for the intensity roll-off.

To illustrate the computation of the map C, the following description is provided based on a simulated image having a flat white profile, where a large number of phase configurations seeded by an optimized phase initialization are integrated. In such a case, it is possible to extract the intensity roll-off information from the integrated flat white image $\tilde{I}_W(x',y')$ by, for example, fitting a two-dimensional Gaussian function to the integrated image. This may be represented by the following expressions (8) and (9):

$$\min_{\sigma_x, \sigma_y, a \in \mathbb{R}} \left| \tilde{I}_W - ae^{-\left(\frac{x'^2}{2\sigma_x^2} + \frac{y'^2}{2\sigma_y^2}\right)} \right|^2 \tag{8}$$

$$\tilde{I}_C = ae^{-\left(\frac{x'^2}{2\sigma_x^2} + \frac{y'^2}{2\sigma_y^2}\right)} \quad (9)$$

The compensation map C may then be derived from $\tilde{I}_C$ using, as one example, the following expression (10):

$$C = 1 - \tilde{I}_C + \min(\tilde{I}_C) \quad (10)$$

In expression (10), $\min(\tilde{I}_C)$ is a function that returns the minimum value of the array $\tilde{I}_C$. The calculation of the compensation map C may be performed once (e.g., during a cinema projector calibration procedure) and stored so that it may be subsequently applied to different input frames in a video sequence.

Alternatively, intensity roll-off compensation may be performed by scaling the target image instead of through the use of the compensation map C. In such a case, the algorithm may be modified to apply an image scaling transformation S as represented according to the following expression (11):

$$A_M \angle \phi_M = P^{-1}(\sqrt{(S(I))} \angle \phi_R) \quad (11)$$

The scaling transformation S reduces the effective resolution of image I and pads the result with zeros, and therefore has the same resolution as the original image I.

Super-Resolution

As noted above, the image data corresponds to an image on a screen at a particular image resolution. As further noted above, the PLM includes an array of pixel elements and thus has a particular PLM resolution. A higher image resolution generally corresponds to a more detailed (or higher definition) image. However, a higher PLM resolution may be costly, may have long switching times, and/or may present manufacturing or other logistical difficulties. Therefore, it may be desirable to use a PLM having a PLM resolution that is lower than the image resolution. This is possible because the nature of the PLM allows for light to be steered to almost any location on the reconstruction image plane, not just locations on a fixed pixel grid. This steering, coupled with the fast response time of the PLM, enables the generation of super-resolution images on the reconstruction image plane; that is, images having a higher resolution than the PLM resolution. Generally when producing a high-quality image, the desired image resolution is proportional to the number of phase configurations to be integrated, because the magnitude of the information content generated by one solution is fixed.

As an example, a PLM having a 960×540 array of pixel elements (and thus a PLM resolution of 960×540) may be used to produce a 1080p image (having an image resolution of 1920×1080). In such a case, the target image is decomposed into four smaller images containing four phases of the target image, and a number of image phase solutions are computed at the PLM resolution. In this example, the super-resolution operation uses four phases because the image resolution is two times the PLM resolution in each direction. Then, a tilt phase solution is computed that, when combined with the image phase solution, globally shifts the reconstructed image such that the reconstructed data is in the correct location with the desired reconstruction. One example of a tilt function for calculating the tilt phase solution is given by the following expression (12):

$$W(x, y) = \frac{1}{f}(\vec{P} \cdot \vec{x}) \quad (12)$$

In expression (12), W(x,y) is the tilt wavefront scalar field that must be converted to phase for the given wavelength and combined with the image phase solution; P is the desired solution-panning vector along the reconstruction image plane; x is the position on the modulator plane, and f is the working distance.

Expression (12) is not the only tilt function which may be used to calculate the tilt phase solution. In some aspects of the present disclosure, the tilt function may be a piecewise linear function or a smooth function such that spots targeted on the reconstruction plane are not uniformly spaced at any given time. This may result in a spatial distribution of the available PLM resolution over the reconstructed image.

Figure 8A:
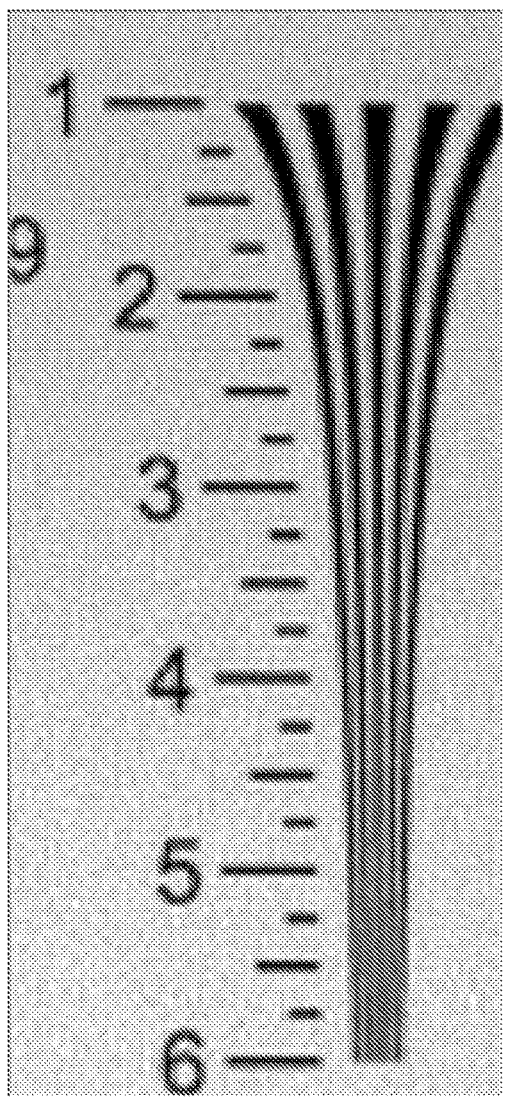
FIGS. 8A-8B respectively illustrate display images in accordance with various aspects of the present disclosure.
Figure 8B:
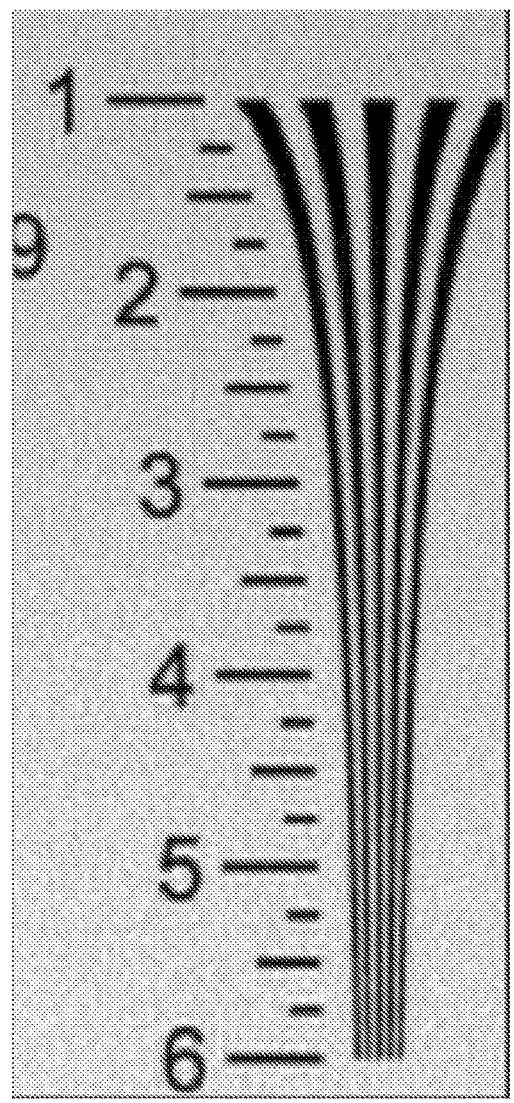

FIGS. 8A-8B illustrate the effects of a super-resolution operation applied to a system having a PLM resolution that is smaller than the image resolution. In FIGS. 8A-8B, the PLM resolution is 960×540. FIG. 8A illustrates a portion of a reconstructed image where no super-resolution operation is applied and FIG. 8B illustrates the same portion of the reconstructed image where a four-phase super-resolution operation is applied, respectively. In FIG. 8A, because no super-resolution operation is applied the image resolution is 960×540, equivalent to the PLM resolution. In FIG. 8B, however, the image resolution is increased to 1920×1080. As can be seen by comparing FIGS. 8A-8B, the super-resolution operation results in an improved image quality.

Effects

Due to the beam-steering nature of the projection systems and methods described herein, it is possible to achieve very high static contrast on the order of 500,000:1 or more. As compared to multi-stage modulator systems, the system described herein is able to create brighter objects using the same amount of input optical power. This is because the projection systems and methods described herein do not utilize a second modulator and thus do not experience its associated efficiency penalty, and because the projection systems and methods described herein have a smaller projected PSF such that smaller and brighter objects can be generated.

Because the projection systems and methods described herein can generate a high overall dynamic range, global amplitude modulation may be implemented to address any elevated floor levels and thus provide increased flexibility in selecting the particular optical components. Moreover, because the image reproduction is implemented by steering that is not affected by system resolution, any residual noise may be perceived by a viewer as "organic" or resembling film grain.

Systems, methods, and devices in accordance with the present disclosure may take any one or more of the following configurations.

(1) A projection system, comprising: a light source configured to emit a light in response to an image data; a phase light modulator configured to receive the light from the light source and to apply a spatially-varying phase modulation on the light; and a controller configured to: determine, for a frame of the image data, a plurality of phase configurations, respective ones of the plurality of phase configurations corresponding to solutions of a phase algorithm and representing the same image with a different modulation pattern, and provide a phase control signal to the phase light modulator, the phase control signal configured to cause the phase light modulator to modulate light in accordance with the plurality of phase configurations in a time-divisional manner within a time period of the frame, thereby causing the projection system to project a series of subframes within the time period.

(2) The projection system according to (1), wherein the plurality of phase configurations is 60 phase configurations.

(3) The projection system according to (1) or (2), wherein the phase algorithm is initialized with a random or pseudo-random seed.

(4) The projection system according to any one of (1) to (3), wherein the phase algorithm is configured to establish a bidirectional mapping between a field at a modulation plane where the phase light modulator is disposed, and a field at a reconstruction plane where an image is formed by the phase light modulator.

(5) The projection system according to any one of (1) to (4), wherein the image data has an image resolution, the phase light modulator has a modulation resolution corresponding to a number of pixel elements in the phase light modulator, and the modulation resolution is lower than the image resolution.

(6) The projection system according to (5), wherein the image resolution is four times the modulator resolution.

(7) The projection system according to any one of (1) to (6), wherein the phase algorithm is based on a compensation map for modifying a target intensity of the image data or on a scaling transformation for modifying an effective resolution of the image data.

(8) The projection system according to any one of (1) to (7), wherein the phase light modulator includes a plurality of pixel elements arranged in an array, and circuitry configured to modify respective states of the plurality of pixel elements in response to the phase control signal.

(9) The projection system according to any one of (1) to (8), wherein the phase light modulator is a digital micro-mirror device.

(10). The projection system according to any one of (1) to (8), wherein the phase light modulator is a liquid-crystal-on-semiconductor device.

(11) A method of driving a projection system, comprising: emitting a light by a light source, in response to an image data; receiving the light by a phase light modulator; applying a spatially-varying phase modulation on the light by the phase light modulator; for a frame of the image data, determining a plurality of phase configurations, respective ones of the plurality of phase configurations corresponding to solutions of a phase algorithm and representing the same image with a different modulation pattern; and providing a phase control signal to the phase light modulator, and thereby causing the phase light modulator to modulate light in accordance with the plurality of phase configurations in a time-divisional manner within a time period of the frame, and thereby projecting a series of subframes within the time period.

(12) The method according to (11), further comprising establishing, by the phase algorithm, a bidirectional mapping between a field at a modulation plane where the phase light modulator is disposed, and a field at a reconstruction plane where an image is formed by the phase light modulator.

(13) The method according to (12), wherein the bidirectional mapping is a Rayleigh-Sommerfeld propagation.

(14) The method according to (12) or (13), wherein the phase algorithm iteratively generates the bidirectional mapping to generate a solution for the field at a modulation plane that is free from amplitude information, based on a target of the field at the reconstruction plane.

(15) The method according to any one of (11) to (14), further comprising initializing the phase algorithm with a seed distribution.

(16) The method according to (15), wherein the seed distribution is a uniform distribution.

(17) The method according to (15) wherein the seed distribution is generated by applying an iterative algorithm to a random phase pattern.

(18) The method according to (15), wherein the seed distribution for the frame is based on a reconstruction field from a preceding frame.

(19) The method according to any one of (15) to (18), further comprising, for the frame, dynamically determining whether to generate the seed distribution anew or to base the seed distribution on a preceding frame.

(20) A non-transitory computer-readable medium storing instructions that, when executed by a processor of a projection device, cause the projection device to perform operations comprising the method according to any one of (11) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A projection system, comprising:
a light source configured to emit a light in response to an image data;
a phase light modulator configured to receive the light from the light source and to apply a spatially-varying phase modulation on the light to generate an output image;
and
a controller configured to:
determine, for a frame of the image data, a plurality of phase configurations, respective ones of the plurality of phase configurations corresponding to solutions of iterations of a phase algorithm and representing the same image with a different modulation pattern, and
provide a phase control signal to the phase light modulator, the phase control signal configured to cause the phase light modulator to modulate light in accordance with the plurality of phase configurations in a time-divisional manner within a time period of the frame, thereby causing the projection system to project a series of subframes within the time period to form the output image on a screen, wherein the phase algorithm is based on a compensation map for modifying a target intensity of the image data or on a scaling transformation for modifying an effective resolution of the image data.

2. The projection system according to claim 1, wherein the plurality of phase configurations is 60 phase configurations.

3. The projection system according to claim 1, wherein the phase algorithm is initialized with a random or pseudo-random seed.

4. The projection system according to claim 1, wherein the phase algorithm is configured to establish a bidirectional mapping between a field at a modulation plane where the phase light modulator is disposed, and a field at a reconstruction plane where an image is formed by the phase light modulator.

5. The projection system according to claim 1, wherein the image data has an image resolution, the phase light modulator has a modulation resolution corresponding to a number of pixel elements in the phase light modulator, and the modulation resolution is lower than the image resolution.

6. The projection system according to claim 5, wherein the image resolution is four times the modulator resolution.

7. The projection system according to claim 1, wherein the phase light modulator includes a plurality of pixel elements arranged in an array, and circuitry configured to modify respective states of the plurality of pixel elements in response to the phase control signal.

8. The projection system according to claim 1, wherein the phase light modulator is a digital micromirror device or a liquid-crystal-on-semiconductor device.

9. The projection system according to claim 1, wherein the controller is configured to initialize the phase algorithm with a seed distribution.

10. The projections system according to claim 9, wherein the controller is configured to determine the seed distribution for the frame based on a reconstruction field from a preceding frame.

11. The projection system of claim 9, wherein the controller is configured to dynamically determine, for the frame, whether to generate the seed distribution anew or to base the seed distribution on a preceding frame.

12. A method of driving a projection system, comprising:
emitting a light by a light source, in response to an image data;
receiving the light by a phase light modulator;
applying a spatially-varying phase modulation on the light by the phase light modulator, thereby generating an output image;
for a frame of the image data, determining a plurality of phase configurations, respective ones of the plurality of phase configurations corresponding to solutions of iterations of a phase algorithm and representing the same image with a different modulation pattern; and
providing a phase control signal to the phase light modulator, and thereby causing the phase light modulator to modulate light in accordance with the plurality of phase configurations in a time-divisional manner within a time period of the frame, and thereby projecting a series of subframes within the time period to form the output image on the screen, wherein the phase algorithm is based on a compensation map for modifying a target intensity of the image data or on a scaling transformation for modifying an effective resolution of the image data.

13. The method according to claim 12, further comprising establishing, by the phase algorithm, a bidirectional mapping between a field at a modulation plane where the phase light modulator is disposed, and a field at a reconstruction plane where an image is formed by the phase light modulator.

14. The method according to claim 13, wherein the bidirectional mapping is a Rayleigh-Sommerfeld propagation.

15. The method according to claim 13, wherein the phase algorithm iteratively generates the bidirectional mapping to generate a solution for the field at a modulation plane that is free from amplitude information, based on a target of the field at the reconstruction plane.

16. The method according to claim 12, further comprising initializing the phase algorithm with a seed distribution.

17. The method according to claim 16, wherein the seed distribution is a uniform distribution and/or wherein the seed distribution is generated by applying an iterative algorithm to a random phase pattern and/or wherein the seed distribution for the frame is based on a reconstruction field from a preceding frame.

18. The method of claim 16, further comprising, for the frame, dynamically determining whether to generate the seed distribution anew or to base the seed distribution on a preceding frame.

19. A non-transitory computer-readable medium storing instructions that, when executed by a processor of a projection system, cause the projection system to perform operations comprising the method according to claim 12.

\* \* \* \* \*